United States Patent [19]

Stern

[11] Patent Number: 4,868,780

[45] Date of Patent: Sep. 19, 1989

[54] EMULATION CIRCUIT FOR INTERFACING JOYSTICK TO ROM CARTRIDGE SLOT OF COMPUTER

[75] Inventor: David R. Stern, Hinsdale, Ill.

[73] Assignee: Ambrosia Microcomputer Products, Inc., Hinsdale, Ill.

[21] Appl. No.: 78,213

[22] Filed: Jul. 27, 1987

[51] Int. Cl.[4] ............... G06F 13/14; G06F 3/033; G06F 9/44

[52] U.S. Cl. ................. 364/900; 364/709.09; 364/926; 364/926.1; 364/927.99; 364/927.81

[58] Field of Search ........... 340/709, 798, 706, 825.19; 273/148 B, 85 G; 364/200 MS File, 900 MS File; 200/6 A

[56] References Cited

U.S. PATENT DOCUMENTS

| | | | |
|---|---|---|---|
| 4,148,014 | 4/1979 | Burson | 340/709 |
| 4,180,805 | 12/1979 | Burson | 273/85 G |
| 4,306,232 | 12/1981 | Burson | 273/85 G |
| 4,349,708 | 9/1982 | Asher | 273/148 |
| 4,488,017 | 12/1984 | Lee | 340/706 |
| 4,520,355 | 5/1985 | Mitch | 340/706 |
| 4,638,451 | 1/1987 | Hester et al. | 364/900 |

OTHER PUBLICATIONS

R. A. Dayan et al, "Joystick Alternate to Cursor Control Keys", IBM Technical Disclosure Bulltin, vol. 27, No. 10E, Mar. 1985-pp. 6209-6210.

Primary Examiner—Archie E. Williams, Jr.
Assistant Examiner—Malcolm G. Andrews
Attorney, Agent, or Firm—Robert J. Black

[57] ABSTRACT

A circuit providing a joystick interface to a computer. The circuit plugs into the cartridge slot of the computer and receives power from the computer. The circuit includes an analog interface circuit, a read only memory (ROM) containing both a machine language program to drive the analog interface circuit, and a machine language application program. The analog interface circuit includes an analog-to-digital converter, a clock circuit, and a decoder. The circuit of the present invention also includes a tri-state bus interface circuit to communicate the state of input switches to the computer.

15 Claims, 2 Drawing Sheets

EMULATION CIRCUIT FOR INTERFACING JOYSTICK TO ROM CARTRIDGE SLOT OF COMPUTER

BACKGROUND OF THE INVENTION

Computer systems use various methods of receiving information from a user, such as serial I/O ports, parallel I/O ports, keyboards, bus expansion slots and cartridge slots. If a computer program requires the ability to receive analog inputs, a circuit is required to convert the analog inputs to a digital value and to present that value to the computer through one of its methods of input. In addition, if a computer requires the ability to sense the position of a switch, a circuit is required to convert the switch position to a digital value and to present that value to the computer through one of its methods of input. While computer interface circuits are known, the present invention utilizes a novel arrangement of interfacing analog devices to a computer through use of the computer's cartridge slot.

While many of the available ports of a computer could be used with an analog interface circuit, the cartridge slot was selected for this invention. A cartridge slot is an input port of a computer that is designed to let the computer read the contents of read only memories on the printed circuit board plugged into the cartridge slot. This arrangement allows both the reading of data or the reading of instructions for execution. The cartridge slot was selected for the following reasons:

(1) The other ports remain available for their intended purposes.

(2) The application program, the analog and switch interface circuit, and the interface driver program can all use the cartridge slot, requiring only one circuit board.

(3) The parallel data bit input arrangement and the integral software driver allows the design of a cost effective (simple) interface.

SUMMARY OF THE INVENTION

In the present invention, an ADC0809 analog-to-digital converter integrated circuit is used. This device is an 8-bit analog-to-digital converter with an 8-channel analog multiplex on the input and tri-state outputs. Three gates of a hex inverter chip are used with two resistors and one capacitor to provide a clock for the analog-to-digital converter. The eight output bits of the converter are connected to eight of the data input leads of the cartridge slot. Three address bits from the cartridge slot are connected to three input multiplex address bits on the analog-to-digital converter. Three dimensional address bits and two control bits from the cartridge slot are applied to the inputs of a decoder to produce three control signals for the analog-to-digital converter and one control signal to enable a tri-state buffer. The analog-to-digital converter outputs and the tri-state buffer outputs are read by the computer through the cartridge slot simultaneously. The converter outputs contain the results of one analog-to-digital conversion, while the tri-state buffer provides switch status bits.

This invention could be used with any computer having a cartridge slot designed to access an applications program in read only memory. The example used in this disclosure interfaces to an Atari ST series computer. The Atari ST cartridge slot includes 15 address signals, 16 data signals, two bank select signals, and two read strobe signals. The cartridge slot signals of other computers will contain similar signals; however, some might only have one bank of memory. In that case, a decode of some address bits would have to be added to generate the two bank selects (one to select ROM, and one to select the interface). If the computer had only an 8-bit data bus, the 8-bit analog conversion data and the switch status bits would have to be enabled on to the bus with two separate enable signals. The example shown has a 16-bit data bus so all inputs are enabled with one enable signal. There are five spare outputs of the decoder IC, one of which could be used if a second enable signal were required.

DESCRIPTION OF THE DRAWINGS AND TABLES

The present invention is described in detail below with reference to the accompanying drawing, wherein.

TABLE A is a list of assembly language instructions for the Motorola 68000 microprocessor in an Atari ST computer and the effect these instructions have on the invention.

Table B is a listing of the ROM based interface driver program for an Atari ST computer.

DESCRIPTION OF THE PREFERRED EMBODIMENT

Figure 1:
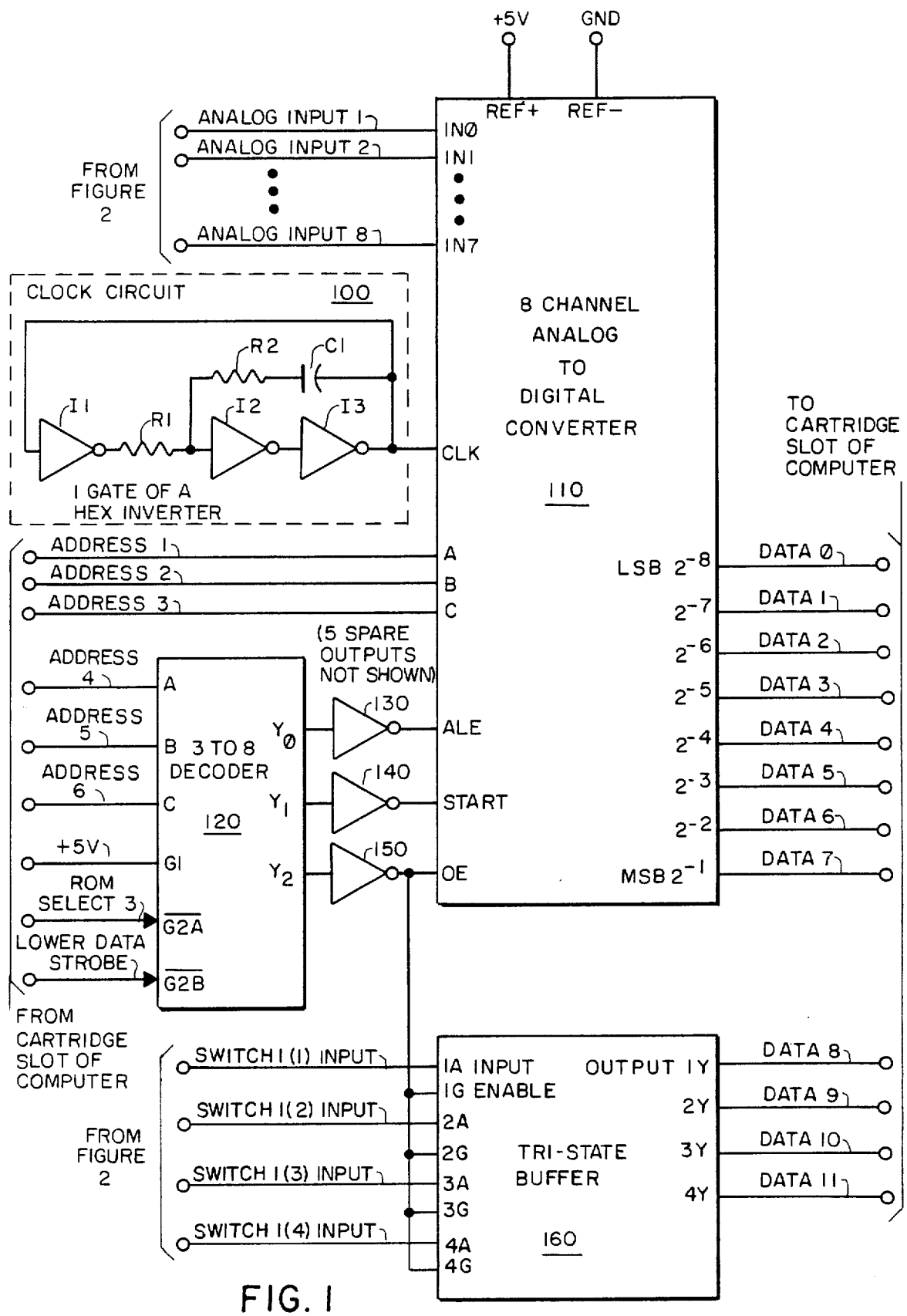
FIG. 1 is a schematic diagram of the analog interface and the switch (digital) interface portion of the invention (designed for the Atari ST series computer as an example).

The basic function of the circuit shown in FIG. 1 is to interface eight analog signals and four digital signals to a computer.

Clock circuit 100 is an arrangement of three inverters (I1, I2 and I3), two resistors (R1 and R2), and one capacitor (C1). The output of this circuit (inverter I3 output) provides a clock input to analog-to-digital converter 110.

The cartridge slot of the computer is designed to access (read from) read only memories. The signals required to perform this function are address signals, data signals and data strobes. In the circuit of the present invention, the cartridge slot signals for an Atari ST series computer are used. These signals include 15 address signals, two ROM select signals (decodes of high order address signals used to select which 64k bank of ROM is being accessed), 16 data signals and two data strobe signals. The data strobe signals enable the upper and lower bytes of data to be returned to the computer at the correct time. The present invention only requires one 64k bank of ROM for the application program and the interface driver program. Therefore, the second bank select signal (ROM SELECT 3 which is active when the computer reads from any hexadecimal address between fb0000 and fbffff) is used as an enable to the analog interface circuit. The ROM SELECT 3 signal is applied to the G2A input of 3-to-8 decoder 120 to enable its outputs. There are no output signals from decoder 120 unless the ROM SELECT 3 signal is active.

The LOWER DATA STROBE signal from the cartridge slot is applied to the G2B input of decoder 120. This signal ensures that the decoder output is active only when the cartridge slot address bus contains a stable address. The G1 input is unused and is wired to +5 volts. Cartridge slot address bits 4, 5 and 6 are applied to the A, B and C inputs of decoder 120. These three bits are used to encode the opcode of the computer instructions to the interface circuit. Three opcodes are used by this interface circuit (five are spare).

The Y0 output of decoder 120 is connected to the input of inverter 130. Inverter 130 is used to convert the logic level "0" active signal provided by decoder 120 at output Y0 into the logic level "1" active signal required by converter 110. The output of inverter 130 is wired to the ALE (address latch enable) input of analog-to-digital converter 110. Therefore, an opcode of 0 (ADDRESS 4=0, ADDRESS 5=0, ADDRESS 6=0) is a command to the interface circuit which causes analog-to-digital converter 110 to latch a three bit address (ADDRESS 1, 2 and 3) appearing at inputs A, B and C. Since cartridge slot address bits 1, 2 and 3 are applied to the A, B and C inputs of analog-to-digital converter 110, cartridge slot address bits 1, 2 and 3 are latched by analog-to-digital converter 110. These three bits are used by converter 110 to select which analog input (one of eight) to route through its internal eight-to-one analog multiplex for conversion to a digital value.

The Y1 output of decoder 120 is connected to the input of inverter 140. Inverter 140 is used to convert the logic level "0" active signal provided by decoder 120 at output Y1 into the logic level "1" active signal required by converter 110. The output of inverter 140 is wired to the START (start analog-to-digital converter process) input of analog-to-digital converter 110. Therefore, an opcode of 1 (ADDRESS 4=1, ADDRESS 5=0, ADDRESS 6=0) is a command to the interface circuit which causes analog-to-digital converter 110 to initiate its internal sequence that converts the analog input passed through its internal multiplex into a digital value, and stores that value in its internal output register.

The Y2 output of decoder 120 is connected to the input of inverter 150. Inverter 150 is used to convert the logic level "0" active signal provided by decoder 120 at output Y2 into the logic level "1" active signal required by converter 110. The output of inverter 150 is wired to the OE (output enable) input of analog-to-digital converter 110. Therefore, an opcode of 2 (ADDRESS 4=0, ADDRESS 5=1, ADDRESS 6=0) is a command to the interface circuit which causes analog-to-digital converter 110 to place the contents of its internal output register onto its eight outputs ($2^{-8}$ thru $2^{-1}$). The eight output signals, DATA 0 through DATA 7, appearing at these outputs contain the digital value of the previous analog-to-digital conversion. The DATA 0 through DATA 7 signals are applied to the computer's data bus by converter 110 at a time specified by the computer's LOWER DATA STROBE signal. This signal enables the signal which appears at the OE input of converter 110 and enables the output of that converter. The output data from converter 110 is thus available to the computer, at the computer cartridge slot, via a read instruction that initiated the above-described signals from the computer.

The output of inverter 150 is also wired to the four enable inputs (1G, 2G, 3G and 4G) of tri-state buffer 160. The activation of the logic level "1" signal at this output by an opcode of 2 was explained above. The logic level "1" signal from inverter 150 causes the signals present at inputs 1A, 2A, 3A and 4A of tri-state buffer 160 to appear at its 1Y, 2Y, 3Y and 4Y outputs, respectively. The DATA 8 through DATA 11 signals appearing at these outputs are applied to the computer cartridge slot, and thus they are also applied to the computer data bus. These four signals are available to the computer along with the eight signals from the converter described previously.

Figure 2A:
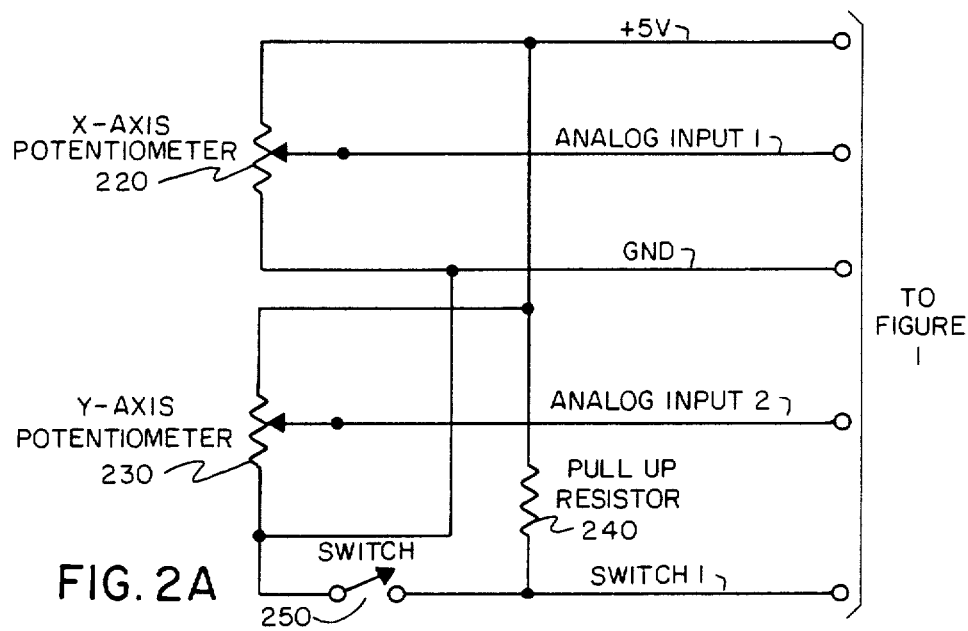
FIG. 2A is a schematic diagram of an interface circuit for a two-axis joystick and a separate switch.

While any logic level signal could be interfaced to the computer using this circuit, FIG. 2A shows x-axis and y-axis potentiometers 220 and 230, respectively, and switch 250 which are the sources of signals for converter 110 and tri-state buffer 160. If switch 250 is open, the SWITCH 1 signal is pulled up to a logic level "1" by pull up resistor 240. If switch 250 is closed, the SWITCH 1 signal is grounded through switch 250, thereby providing a logic level "0" signal to tri-state buffer 160. Although there is only one switch source shown, tri-state buffer 160 could interface four such sources to the computer.

Four of these circuits could be connected to the circuit of FIG. 1. Each of the two potentiometers provides an analog voltage (between 0 and +5 volts) and the switch provides a logic level "1" (+5 volts) or a logic level "0" (ground) signal.

The eight analog inputs to be converted (ANALOG INPUT 1 through ANALOG INPUT 8) are applied to the eight inputs (IN0-IN7) of analog-to-digital converter 110. While any voltage source that provides a voltage between 0 and +5 volts could be converted by this invention, the example shown in FIG. 2 is a two-axis joystick source. With 5 volts placed across x-axis potentiometer 220 and y-axis potentiometer 230 as shown, ANALOG INPUT 1 and ANALOG INPUT 2 voltages will vary between 0 and 5 volts depending on the position of the joystick. Since these signals are connected to the IN0 and IN1 inputs of analog-to-digital converter 110, the position of the joystick provides the voltage to be converted and then placed on the computer data bus as a digital value. Only one joystick (two analog inputs) is shown in FIG. 2A. However, the invention could interface up to four joysticks (eight analog values) to the computer.

The REF+ input of converter 110 is connected to +5 volts and the REF− input is connected to ground. This provides reference points for converter 110 during its conversion process. (A 0 volt input will result in a digital output value of 0, and A +5 volt input will result in a digital output value of 255.) Intermediate input voltages will result in corresponding intermediate digital output values that are proportional to those input voltages.

Figure 2B:
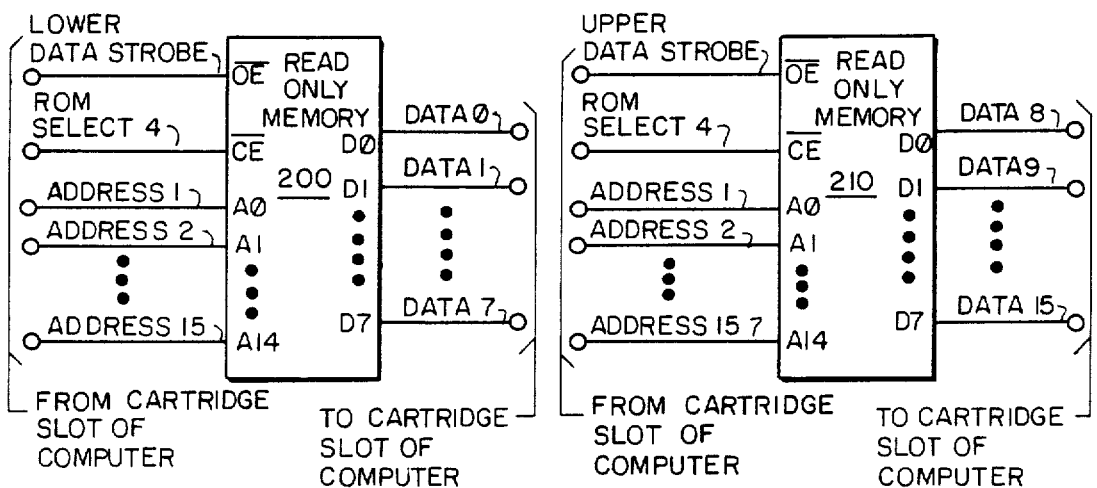
FIG. 2B is a schematic diagram of the read only memory portion of the invention (designed for the Atari ST series computer as an example).
Figure 3:
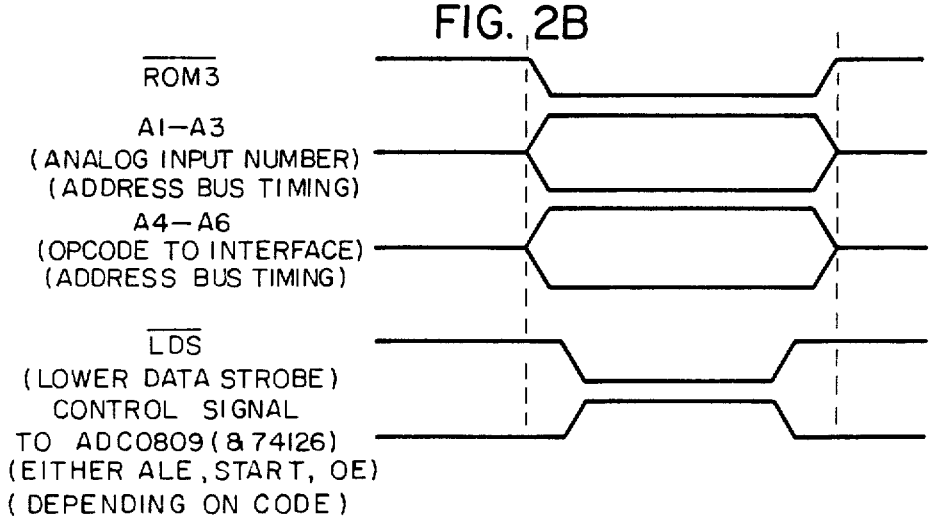
FIG. 3 is a timing chart showing the various time relationships of interface signals in an Atari ST cartridge slot.

FIG. 2B shows that circuit diagram for the read only memory (ROM) part of the invention. This figure shows two 32k by 8 bit ROM integrated circuits 200 and 210. These two ROMs provide 32k 16 bit words of information to the computer. If the invention were used on an 8 bit computer, these two ROMs could provide 64k bytes of information. ADDRESS 1 through ADDRESS 15 signals from the cartridge slot are applied to inputs A0 through A14 of both ROM 200 and ROM 210, thereby allowing the computer to address the information stored in those ROMs. Outputs D0 through D7 of ROM 200 provide data signals DATA 0 through DATA 7 which are then applied to the computer cartridge slot. Outputs D0 through D7 of ROM 210 provide data signals DATA 8 through 15 which are also applied to the computer cartridge slot. The ROM SELECT 4 signal from the computer cartridge slot provides enable signals to the CE (chip enable) inputs of both ROM 200 and ROM 210. The LOWER DATA STROBE from the computer cartridge slot provides an output enable signal to the OE input of ROM 200. Similarly, the UPPER DATA STROBE from the computer cartridge slot provides an output enable signal to the OE input of ROM 210. The computer is designed to directly access these ROM integrated circuits through the computer cartridge slots. Read only memories 200 and 210 contain software for a specific computer. The software comprises an interface driver program to control the interface circuit of the present invention and an application program that utilizes the interface circuit for proper operation.

The interface driver program updates a data table in the computer's memory so that the values in the table represent the positions of the joysticks and switches. The application program is any program that utilizes joystick or switch inputs from a user. It accesses the data table generated by the interface driver program to obtain the current joystick and switch positions. Therefore, the application programmer does not have to be concerned with interface hardware details.

The following is an example of how the software controls the interface circuit in Motorola 68000 assembly language. A "move" instruction moves data in the computer. A ".w" representation specifies that a word (16 bits) is to be moved. The number following a "$" is a hexadecimal memory address. A "d0" representation refers to data register 0. Thus, the instruction "move.w $fb0004,d0" will move the 16 bits of data in hexadecimal memory location fb0004 to register d0. In order to perform this instruction, the computer would read memory location fb0004. To do this, the memory address fb0004 would be placed on the address bus and the proper bank select and strobes would be sent. Address bit 0 (A0) is the least significant bit (right side of memory address numbers). For example, when fb0004 is placed on the Atari ST address bus, the "fb" representation (high order bits) is decoded to generate the bank select. The "0004" representation (0000 0000 0000 0100 binary) results in a logic level "0" signal appearing at all address bit inputs except address bit input A2 which has a logic level "1" signal. The normal purpose of this instruction would be to read location fb0004 and place the contents in register d0. However, the purpose in this case is to set up specific address bits, bank select bits, and read strobes to control the interface circuitry. These "move" instructions are actually being used to send instructions to the interface circuit and to read data from that circuit.

TABLE A shows a list of all of the move instructions that affect the invention and the result of the execution of each instruction.

TABLE A

| INSTRUCTION | EFFECT IN INTERFACE |
|---|---|
| move.w $fb0000,d0 | Select analog input 1 |
| move.w $fb0002,d0 | Select analog input 2 |
| move.w $fb0004,d0 | Select analog input 3 |
| move.w $fb0006,d0 | Select analog input 4 |
| move.w $fb0008,d0 | Select analog input 5 |
| move.w $fb000a,d0 | Select analog input 6 |
| move.w $fb000c,d0 | Select analog input 7 |
| move.w $fb000e,d0 | Select analog input 8 |
| move.w $fb0010,d0 | Issue start conversion command |
| move.w $fb0020,d0 | Read joystick interface data into register d0. Data bits 0-7 contain |

TABLE A-continued

| INSTRUCTION | EFFECT IN INTERFACE |
|---|---|
|  | the results of one analog-to-digital conversion and data bits 8-11 contain the four switch states. |

In order to utilize the interface circuit, the following sequence should be used:

| | |
|---|---|
| move.w $fb0004,d0 | This instruction normally would read memory location fb0004 and put the contents in register d0. However, since the address fb0004 is in ROM bank 3, the ROM SELECT 3 signal would become active. With this fb0004 address, the ADDRESS 0 signal is a logic level "0", the ADDRESS 1 signal is a logic level "0", the ADDRESS 2 signal is a logic level "1", and the ADDRESS 3 signal is a logic level "0". The ADDRESS 0 signal is a logic level "0" during word operations; consequently a binary 2 (i.e., ADDRESS 1 = 0, ADDRESS 2 = 1, and ADDRESS 3 = 0) is present at the A, B and C inputs (the analog mux address) of converter 110. Since ADDRESS 4 = 0, ADDRESS 5 = 0, and ADDRESS 6 = 0, there is a binary "0" present at the A, B and C inputs of decoder 120. Since a read operation is being done as a result of this instruction, the computer will cause a LOWER DATA STROBE signal to be generated after the address bus has been set up. There will be a pulse on the Y0 output of decoder 120 as a result of inputs just described. Since this output is connected through an inverter to the ALE (address latch enable) input of analog-to-digital converter 110, the net result of this move instruction is to latch a 2 in a register internal to converter 110. Therefore, the next analog input to be converted will be ANALOG INPUT 3. |
| move.w $fb0010,d0 | This instruction would normally read the contents of memory location fb0010 and put the results in register d0. However, since address fb0010 is in ROM bank 3, the ROM SELECT 3 signal would become active. Since ADDRESS 4 = 1, ADDRESS 5 = 0, AND ADDRESS 6 = 0, there is a binary "1" present at the A, B and C (A=0, B=0, C=1) inputs of decoder 120. Since a read is being done, there will be a LOWER DATA STROBE after the address bus has been set up. There will be a pulse on the Y1 output of decoder 120 as a result of inputs just described. Since this output is connected through inverter 140 to the START input of analog-to-digital converter 110, the net result of this move instruction is to issue a start conversion command to analog-to-digital converter 110. |
| The program must wait at least 100 us for the conversion to complete. This is a function of the conversion rate of the converter used. | |
| move.w $fb0020,d0 | This instruction would normally read | the contents of memory location fb0020 and put the results in register d0. However, since address fb0020 is in ROM bank 3, the ROM SELECT 3 signal would become active. Since ADDRESS 4 = 0, ADDRESS 5 = 1, and ADDRESS 6 = 0, there is a binary "2" present at the A, B and C inputs of decoder 120 (A=0, B=1, C=0). Since a read operation is being done, there will be a LOWER DATA STROBE after the address bus has been set up. There will be a pulse on the Y2 output of decoder 120 as a result of the inputs just described. Since this output is connected through inverter 150 to the OE input of analog-to-digital converter 110 and the IG input of tri-state buffer 160, analog-to-digital converter 110 applies the results of the last conversion to the data bus via the DATA 0 - DATA 7 signals. Similarly, tri-state buffer 160 applies the four switch states to the data bus via the DATA 8 - DATA 11 signals. This data will be moved to register d0 in the computer by the normal read cycle.

The application program and the interface driver program are contained in the ROM shown in FIG. 2B. This ROM is selected by ROM SELECT 4 (addresses from fa0000 to faffff). Any disk based application utilizing analog inputs or switch inputs could use this invention using the ROM based interface driver program or by using its own driver program.

A listing of the ROM based interface driver program for an Atari ST series computer is displayed in TABLE B. This program is called upon the occurrence of a timer interrupt. During one execution, it stores the analog-and-switch data in the computer memory. This data was selected through the multiplex during the previous execution of the interface driver program. The analog-to-digital converter START conversion command was also given during the previous execution of the interface driver program. The current execution then sets up the analog channel number and starts conversion of the next analog input to be read into the computer the next time this interface driver program is called upon the occurrence of a timer interrupt.

TABLE B

CARTRIDGE JOYSTICK INTERFACE IS CALLED UPON A 200 HZ TIMER INTERRUPT
IT READS PREVIOUS JOYSTICK DATA AND SETS UP AND STARTS CONVERSION FOR NEXT SAMPLE
IT KEEPS TRACK OF WHICH ANALOG INPUT IS BEING CONVERTED IN A MEMORY LOCATION LABELED ainnum
IT STORES THE VALUES FOR EACH ANALOG INPUT IN AN 8 WORD TABLE LABELED joy1h (joystick 1 horizontal) for the first entry
IT CONVERTS ALL 8 ANALOG INPUTS IN SEQUENCE SO EACH INPUT IS UPDATED EVERY EIGHTH INTERRUPT
THE SWITCH STATE BITS ARE UPDATED EVERY INTERRUPT

| LABEL | INSTRUCTION | EFFECT ON INTERFACE |
|---|---|---|
| | .globl cartjsi | declares global variable |
| ainnum | dc.w* 0 | analog input number |
| joy1h | dc.w 0 | joystick 1 horizontal |
| joy1v | dc.w 0 | joystick 1 vertical |

TABLE B-continued

| | | |
|---|---|---|
| joy2h | dc.w 0 | joystick 2 horizontal |
| joy2v | dc.w 0 | joystick 2 vertical |
| joy3h | dc.w 0 | joystick 3 horizontal |
| joy3v | dc.w 0 | joystick 3 vertical |
| joy4h | dc.w 0 | joystick 4 horizontal |
| joy4v | dc.w 0 | joystick 4 vertical |
| switches | dc.w 0 | switch data |
| cartjsi | movem.1 d0-d2/a0-a2,-(sp) | save registers on stack |
| | move.w $fb0020,d0 | read previous joystick data from cartridge |
| | andi.1 #$fff,d0 | mask bits from cartridge interface logical and fff with d0 |
| | move.1 d0,d2 | save copy in d2 |
| | lea joy1h,a0 | address of table in a0 load effective address |
| | lea ainnum,a2 | put ainum address in address register 2 load effective address |
| | move.w (a2),d1 | get input number/table offset contents of address a2 to d1 |
| | andi.w #$ff,do | clear switch bits logical and ff with d0 |
| | move.w d0,(a0,d1) | update table move d0 to a0+d1 |
| | lsr.w #8,d2 | shift switch data to low byte logical shift right 8 bits |
| | move.w d2,switches | store switch data |
| | addq.w #2,d1 | next analog input add 2 to d2 |
| | cmp.w #16,d1 | compare counter to 16 |
| | bne.b .0 | have all 8 been done? branch to label ".0" if d1 not equal to 16 |
| | moveq #0,d1 | start over after 8 clear d1 |
| skip | ext.1 d1 | clear high order bits of register d0 this move is an instruction to the interface "skip" is a label |
| | move.w (a1),d0 | load input number this move is an instruction to the interface |
| | move.w $fb0010,d0 | start conversion of next input this move is an instruction to the interface |
| | move.w d1,(a2) | store number of input being converted |
| | bclr.b #5,$fffffaf0 | clear interrupt in service bit for timer a bit clear |
| | return movem.1(sp)+, rte d0-d2/a0-a2 .end | restore registers from stack return from interrupt |

*"dc.w" is an assembler directive to allocate a word of memory and give it the label to the left and the value to the right.

An example of the operation of the invention is described below. This example assumes that a two-axis joystick and a switch (see FIG. 2A) are connected to the invention, and that the invention is connected to an Atari ST series computer.

The joystick is in a position to the right of center and above center. This puts a voltage of 1 volt on ANALOG INPUT 1 and a voltage of 2 volts on ANALOG INPUT 2.

The switch is closed placing a ground on SWITCH 1.

The program shown in TABLE B is running (it is in ROM as a part of the invention). It looks at one of the eight analog inputs and all four switch inputs every time it is called. The program is called upon the occurrence of a timer interrupt, which in this case occurs 200 times per second. Each 1/200 of a second a different analog input is converted until all are done and then the cycle repeats. Therefore, it takes 8/200 or 1/25 second to convert all inputs.

When the program gets to the point in time when ANALOG INPUT 1 is to be converted, the following occurs:

1. A "move.w $fb0020,d0" is executed.

This reads the results of the previous conversion into computer register d0. The previous conversion was set up and started the last time the program ran (1/200 second ago). The program keeps track of which input was previously set up and so it now puts the low 8 bits of d0 into the proper place in a table containing the digital value for each of the eight analog inputs. Bits 8, 9, 10 and 11 are put into a location keeping track of the switch states. In this case, the logic level "0" from SWITCH 1 becomes a logic level "0" in bit 8 in the computer.

2. A "move.w $fb0000,d0" is executed.

This enables ANALOG INPUT 1 through the multiplex internal to analog-to-digital converter 110, which in this case puts 1 volt in position to be converted.

3. A "move.w $fb0010,d0" is executed.

This issues a start conversion command to analog-to-digital converter 110.

4. Control is now returned to the application program which can access the table of analog values or the switch state bits.

5. The next timer interrupt occurs passing control from the application program to the interface program.

6. A "move.w $fb0020,d0" is executed.

This reads the results of the previous conversion into computer register d0. The previous conversion was set up (step 1) and started (step 2) the last time the interface program ran (1/200 second ago). The program keeps track of which input was previously set up and so it now puts the digital value of 1 volt in a table containing the digital value for each of the 8 analog inputs. It puts this entry in the position reserved for input 1. Bits 8, 9, 10 and 11 are again put into a location keeping track of the switch states. In this case, the logic level "0" signal from switch input 1 becomes a logic level 0 in bit 8 of the computer.

7. A "move.w $fb0002,d0" is executed.

This enables ANALOG INPUT 2 through the multiplex at the input of the ADC0809 analog-to-digital converter, which in this case puts 2 volts at that input.

8. A "move.w $fb0010,d0" is executed.

This issues a start conversion command to analog-to-digital converter 110.

9. Control is now returned to the application program which can access the table of analog values or the switch state bits.

10. The next timer interrupt occurs passing control from the application program to the interface program.

11. A "move.w $fb0020,d0" is executed.

This reads the results of the previous conversion into computer register d0. The previous conversion was set up (step 6) and started (step 7) the last time the interface program ran (1/200 second ago). The program keeps track of which inputs was previously set up and so it now puts the digital value for 2 volts in a table containing the digital value for each of the 8 analog inputs. It puts this entry in the position reserved for input 2. Bits 8, 9, 10 and 11 are again put into a location keeping track of the switch states. In this case, the logic level "0" signal from the switch input results in a logic level "0" in bit 8 of the computer.

12. A "move.w $fb0004,d0" is executed.

This enables ANALOG INPUT 3 through the internal multiplex in analog-to-digital converter 110 (in this example, ANALOG INPUT 3 is not connected).

13. A "move.w $fb0010,d0" is executed.

This issues a start conversion command to the analog-to-digital converter 110.

14. Control is now returned to the application program which can access the table of analog values or the switch state bits.

15. The next timer interrupt occurs passing control from the application program to the interface program.

This sequence repeats and therefore the values in the dedicated memory locations are a representation of the voltage on the analog inputs and the switch positions.

While but a single embodiment of the present invention has been disclosed, it will be obvious to those skilled in the art that numerous modifications could be made without departing from the spirit of the invention which shall be limited only by the scope of the claims appended hereto.

What is claimed is:

1. An interface circuit for use between a joystick and a computer of the type having a cartridge slot designed to access an application's program in read only memory (ROM), said interface circuit comprising:

a read only memory, including a plurality of input circuits for connection to said computer via said cartridge slot and a plurality of output circuits for connection to said computer via said cartridge slot;

an analog interface circuit, including an analog-to-digital converter having a first plurality of input circuits for connection to said computer via said cartridge slot, a second plurality of input circuits and a plurality of output circuits for connection to said computer via said cartridge slot;

a decoder circuit, including a plurality of input circuits for connection to said computer via said cartridge slot and a plurality of output circuits connected to said second plurality of analog-to-digital converter input circuits said decoder operated to decode a plurality of additional address bits received via said input circuits in response to control bits received on said input circuits to produce a plurality of corresponding control bits coupled via said included output circuits to said analog-to-digital converter and a signal enable output circuit connected to said analog-to-digital converter and to said buffer circuit;

a clock circuit connected to said analog-to-digital converter, operated to provide periodic pulses to said analog-to-digital converter;

at least one analog control circuit, including a plurality of output circuits connected to said analog-to-digital converter;

a multistate buffer circuit, including a plurality of output circuits for connection to said computer via said cartridge slot and at least one enabling input circuit connected to one of said decoder output circuits; and said analog control circuit, further including an additional output circuit connected to at least one additional input circuit of said multistate buffer circuit.

2. An interface circuit as claimed in claim 1, wherein:
   said read only memory includes a machine language program operated to drive said analog interface circuit.

3. An interface circuit as claimed in claim 1, wherein:

said read only memory (ROM) further includes a machine language application program.

4. An interface circuit as claimed in claim 1, wherein: said read only memory (ROM) input circuits include a plurality of address input circuits, at least a first data strobe input.

5. An interface circuit as claimed in claim 1, wherein: said read only memory output circuits couple data output information to said computer via said cartridge slot.

6. An interface circuit as claimed in claim 1, wherein: said analog-to-digital converter is of the eight bit type, including eight channel analog multiplex inputs and a plurality of tri-state output circuits.

7. An interface circuit as claimed in claim 1, wherein: said analog-to-digital converter output circuits are coupled data to said computer via said cartridge slot.

8. An interface circuit as claimed in claim 1, wherein: each of said plurality of output circuits further include inverter means.

9. An interface circuit as claimed in claim 1, wherein: said clock circuit comprises a plurality of gate circuits, a pair of resistors and a capacitor operated to periodically generate output pulses for transmission to said analog-to-digital converter.

10. An interface circuit as claimed in claim 1, wherein: said analog control circuit includes first and second potentiometers, said first potentiometer operated along a first axis, said second potentiometer operated along a second axis, both of said potentiometers operated in response to a common manual control; and said analog control circuit further including switch means.

11. An interface circuit as claimed in claim 11, wherein: said buffer circuit is operated to communicate the state of said switch means included in said analog control circuit via a circuit connection from said switch included in said analog control circuit connected to an input circuit included in said buffer.

12. An interface circuit as claimed in claim 1, wherein: said buffer circuit inputs included in said buffer include at least one enable circuit connected to one of said decoder output circuits.

13. An interface circuit as claimed in claim 1, wherein: said buffer output circuits are operated to couple data information to said computer via said cartridge slot.

14. An interface circuit as claimed in claim 1, wherein: said analog interface circuit receives operating power from said computer via said cartridge slot.

15. An interface circuit as claimed in claim 1 wherein: said read only memory (ROM) input circuits include a plurality of address input circuits, first and second data strobe inputs and a read only memory (ROM) select input.

* * * * *